US008980206B2

(12) United States Patent
Hamel et al.

(10) Patent No.: US 8,980,206 B2
(45) Date of Patent: Mar. 17, 2015

(54) METHOD AND MULTI-COMPONENT NOZZLE FOR REDUCING UNWANTED SUBSTANCES IN A FLUE GAS

(71) Applicant: Babcock Borsig Steinmueller GmbH, Oberhausen (DE)

(72) Inventors: Stefan Hamel, Wenden (DE); Christian Storm, Duisburg (DE)

(73) Assignee: Babcock Borsig Steinmueller GmbH, Oberhausen (DE)

( * ) Notice: Subject to any disclaimer, the term of this patent is extended or adjusted under 35 U.S.C. 154(b) by 0 days.

(21) Appl. No.: 14/078,932

(22) Filed: Nov. 13, 2013

(65) Prior Publication Data

US 2014/0134086 A1 May 15, 2014

(30) Foreign Application Priority Data

Nov. 14, 2012 (DE) .......................... 10 2012 110 962

(51) Int. Cl.
  B01D 53/56 (2006.01)
  B01D 53/76 (2006.01)
  B01D 53/79 (2006.01)
  B05B 1/14 (2006.01)
  B05B 1/28 (2006.01)
  F23J 7/00 (2006.01)
  F23D 14/48 (2006.01)

(52) U.S. Cl.
  CPC . B01D 53/56 (2013.01); F23J 7/00 (2013.01); B01D 53/76 (2013.01); B01D 53/79 (2013.01); B01D 2251/2062 (2013.01); B01D 2251/2067 (2013.01); B01D 2251/40 (2013.01); B01D 2257/302 (2013.01); B01D 2257/404 (2013.01); B01D 2258/0283 (2013.01)

USPC ........ 423/210; 423/235; 423/239.1; 110/203; 110/234; 110/345; 239/129; 239/290; 239/296; 239/548; 239/549; 239/558

(58) Field of Classification Search
USPC ............... 423/210, 235, 239.1; 110/203, 234, 110/345; 239/129, 290, 296, 548, 549, 558
See application file for complete search history.

(56) References Cited

U.S. PATENT DOCUMENTS

| 4,655,148 | A | | 4/1987 | Winship |
| 4,674,682 | A | | 6/1987 | Hansson |
| 5,048,431 | A | | 9/1991 | Landreth et al. |
| 5,617,715 | A | * | 4/1997 | Beer et al. ........................ 60/783 |
| 6,280,695 | B1 | | 8/2001 | Lissianski et al. |

(Continued)

FOREIGN PATENT DOCUMENTS

| DE | 3541599 A1 | 5/1986 |
| DE | 102004026697 A1 | 12/2004 |
| WO | 8805762 A1 | 8/1988 |

*Primary Examiner* — Timothy Vanoy
(74) *Attorney, Agent, or Firm* — The Webb Law Firm

(57) ABSTRACT

A method is illustrated and described for reducing unwanted substances by injecting a reactant into a flue gas of a steam generator. In order that the reactant can also be used in larger steam generators and/or combustion chambers, a method is proposed, in which the reactant is injected into the combustion chamber of the steam generator via a reactant opening of a multi-component nozzle, in which an enveloping medium is injected into the combustion chamber through at least one enveloping medium opening arranged outside the reactant opening, and in which the enveloping medium at least partly envelops the reactant in the combustion chamber and in this way at least partly shields the reactant from the flue gas.

18 Claims, 3 Drawing Sheets

(56) References Cited

U.S. PATENT DOCUMENTS

| | | |
|---|---|---|
| 2004/0244367 A1 | 12/2004 | Swanson et al. |
| 2005/0013755 A1 | 1/2005 | Higgins |
| 2005/0051067 A1 | 3/2005 | Marx et al. |
| 2005/0173561 A1* | 8/2005 | Cotter et al. ............ 239/398 |
| 2008/0110381 A1* | 5/2008 | Swanson et al. ......... 110/345 |

* cited by examiner

METHOD AND MULTI-COMPONENT NOZZLE FOR REDUCING UNWANTED SUBSTANCES IN A FLUE GAS

CROSS-REFERENCE TO RELATED APPLICATION

This application claims priority to German Patent Application No. 10 2012 110 962.1 filed Nov. 14, 2012, the disclosure of which is hereby incorporated by reference in its entirety.

BACKGROUND OF THE INVENTION

1. Field of the Invention

The invention relates to a method for reducing unwanted substances by injecting a reactant into a flue gas of a steam generator, in which the reactant is injected into the combustion chamber of the steam generator via a reactant opening of a multi-component nuzzle. The invention further relates to a multi-component nozzle for injecting reactant into a combustion chamber of a steam generator for reducing unwanted substances in the flue gas, having a reactant feed for feeding a reactant, wherein on the combustion chamber side the reactant feed opens into a reactant opening. Finally, the invention also relates to a combustion chamber of a steam generator having such a multi-component nozzle.

2. Description of Related Art

Methods and devices of the kind previously mentioned are already known. The reactants are, for example, ammonia and/or urea, which can reduce the proportion of nitrogen oxides in the flue gas. Corresponding methods are labelled selective non-catalytic reduction (SNCR). Typically, the ammonia and/or urea is/are injected in an aqueous solution at one place into the combustion chamber, where a temperature between 850° and 1000° prevails and one of the following reactions takes place:

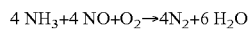

$4\, NH_3 + 4\, NO + O_2 \rightarrow 4\, N_2 + 6\, H_2O$

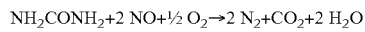

$NH_2CONH_2 + 2\, NO + \tfrac{1}{2}\, O_2 \rightarrow 2\, N_2 + CO_2 + 2\, H_2O$ Different nozzle types are used for this purpose, which are either integrated into the wall of the combustion chamber or project into the combustion chamber in the form of lances. The lances can carry a nozzle fitting, so that the reactant can not only be added at one point but also distributed over the cross section of the combustion chamber by means of a plurality of openings. The use of corresponding lances has the drawback of ash deposition and corrosion, since the lances are exposed to the flue gas and the high flue gas temperatures. In addition, with larger combustion chambers very long lances and elaborate nozzle fittings are required in order to mix the flue gas with the reactant satisfactorily, without, for instance, accepting an increased ammonia slip. Long lances can also be induced into unwanted vibrations. In addition, the lances have to be reliably cooled. Furthermore, when aligned vertically they must be guided through heat exchangers provided above the combustion chamber, so that retrofitting existing equipment due to decreasing limit values is barely possible. Although horizontal and vertical lances can be removed from the combustion chamber for maintenance purposes, provided that they are tubular, they then cover a small cross section of the combustion chamber.

Nozzles embedded in the wall of the combustion chamber have the drawback of a low penetration depth. This can be increased by using so-called two-component nozzles. Typically, ammonia and/or urea in aqueous solution is/are fed to the two-component nozzles. The solution is then delivered into the combustion chamber via a central opening.

An annular opening is provided concentrically around this opening, through which a propellant is additionally injected. Gases, in particular air, are mostly used as the propellant. The air discharges so fast from the nozzle that it carries the reactant into the combustion chamber along with it and nebulises the reactant. Hence, fine droplets of the reactant are formed.

Although the penetration depth in the case of two-component nozzles is greater with liquid reactants than if gaseous ammonia were injected, the penetration depth for large steam generators or large combustion chambers is not sufficient, since the fine droplets of the reactant are carried along by the flue gas and are quickly vaporised due to the high temperature. If the discharge speed of the propellant is increased, the speed of the droplets can also be increased, which should theoretically increase the penetration depth. However, the droplet size then also decreases and more flue gas is sucked in by the propellant jet, so that the droplets vaporise more quickly and thus the penetration depth cannot, in fact, be appreciably increased. Therefore, the reactant only comes close to the middle of the combustion chamber in the case of smaller combustion chambers, so that the flue gas can come into contact with the reactant over the whole cross section of the combustion chamber. Two-component nozzles can also be attached to lances in the combustion chamber but are then also exposed to depositions and corrosion.

SUMMARY OF THE INVENTION

Therefore, the invention is based on the object of designing and further developing the method, the multi-component nozzle and the combustion chamber of the type mentioned in the introduction and previously specified in each case in such a way that the reactant can also be used in larger steam generators and/or combustion chambers, without insufficient mixing of flue gas and reactant occurring or excessive amounts of reactant having to be used.

This object may be achieved by a method in which an enveloping medium is injected into the combustion chamber through at least one enveloping medium opening arranged outside the reactant opening, and in which the enveloping medium at least partly envelops the reactant in the combustion chamber and in this way at least partly shields the reactant from the flue gas.

The previously mentioned object may also be achieved with a multi-component nozzle wherein an enveloping medium feed for feeding an enveloping medium is provided, wherein the enveloping medium feed opens into at least one enveloping medium opening arranged outside the reactant opening, and wherein the reactant opening and the enveloping medium opening are provided such that the enveloping medium at least partly shields the reactant from the flue gas in the combustion chamber.

Finally, the mentioned object may also be achieved with a combustion chamber wherein at least one multi-component nozzle is integrated into at least one wall of the combustion chamber.

The method, the multi-component nozzle and the combustion chamber are described in more detail together below, without always specifically differentiating between the method and the devices, since the preferred features in terms of the method and the devices can in each case be understood by the person skilled in the art from the context.

The invention has basically recognised that the penetration depth of the reactant can be increased by using an enveloping medium, as it can initially at least partly shield the reactant from the flue gas. As a result, mixing of the reactant with the flue gas in the combustion chamber is retarded and in the case of a liquid reactant vaporisation of the reactant is retarded, particularly if the enveloping medium is considerably cooler than the flue gases.

Hence, the enveloping medium fundamentally differs from a propellant used with a two-component nozzle, since the propellant supports the discharge of the reactant and/or its distribution. The reactant discharging from the multi-component nozzle will therefore mix with the propellant very quickly, so that a mixture jet forms and no appreciable shielding of the reactant from the flue gas occurs. The propellant can in the process provide a suction effect for the discharging reactant and ultimately carries it along with it. By corresponding differences in terms of the pressure and/or the speed between the reactant and the propellant, the reactant is finely distributed or atomised, if the reactant is liquid. In the case of a liquid reactant, preferably a spray consisting of droplets forms which can be so fine that a mist forms.

The respectively at least one reactant opening and enveloping medium opening have to be arranged in a suitable way, so that the enveloping medium can at least partly envelop the reactant. It is particularly preferred if the at least one reactant opening is provided approximately centrally, for example in relation to the at least one enveloping medium opening. Therefore, for simplicity, the terms centrally and outside are adhered to, although these terms can be principally understood in a very broad sense.

In a first preferred embodiment of the invention, additionally a propellant can also be used, in order to drive the reactant out of the multi-component nozzle better and/or distribute it in the combustion chamber. As previously described, the propellant forms a highly intermixed mixture jet with the reactant. The mixture jet is then at least partly enveloped by the enveloping medium, so that the reactant is at least partly shielded from the flue gas. In this way, the advantages of better mixing and distribution of the reactant due to the propellant and shielding from the flue gas by the enveloping medium can be combined.

The propellant can flow out of the reactant opening with the reactant. If required, the propellant can be combined with the reactant just shortly before entering the combustion chamber. However, the propellant feed can also feed the propellant to a propellant opening on the combustion chamber side, which is arranged outside the reactant opening, wherein the enveloping medium opening is arranged outside the propellant opening. Particularly preferably, the at least one propellant opening is provided around the at least one reactant opening and the at least one enveloping medium opening is provided around the at least one propellant opening. This can be achieved, for example, if the propellant opening runs annularly around the reactant opening, while the enveloping medium opening runs annularly around the propellant opening. However, the individual openings do not necessarily need to be circular or rotationally symmetrical. For instance, cornered or oval cross sections are also possible.

The reactant opening and the propellant opening do not both necessarily have to lead directly into the combustion chamber. Thus, for example, where the reactant feed and the propellant feed are formed by concentric tubes, the reactant opening can be provided before the propellant opening in the flow direction, so that mixing already starts before entering the combustion chamber and the reactant together with the propellant flows out of the propellant opening into the combustion chamber, or vice versa. However, provision can also be made for the reactant, after it has flowed out of the reactant opening, and for the propellant, after it has flowed out of the propellant opening, to be initially at least partly mixed and then enter the combustion chamber together through a further opening which can be called the mixture jet opening.

When an additional propellant is used, ultimately a three-component nozzle can be obtained which can further increase the penetration depth, for example by increasing the impulse of the flow.

A reactant is basically understood as such which contributes to reducing the proportion of unwanted substances and/or unwanted reactions in the flue gas. These unwanted substances can, for example, be nitrogen oxides and sulphur compounds. Unwanted reactions include, for example, mineral transformations during heating and the subsequent softening of the fuel ash. In order to modify the melting point of the ash, certain minerals can be added according to the composition of the ash. The unwanted reactions result, as required, in unwanted substances in the form of unwanted reaction products. In this connection, mixing the injection with the flue gas and the ash particles in it is also of great importance with regard to effectiveness.

Preferably, the reactant is gaseous, liquid and/or powdery. A conveying fluid possibly used is also considered part of the reactant, such as a solvent. In other words, the reactant is not only understood as the active component but rather the substance or mixture of substances which is fed by means of the reactant feed to the reactant opening. A conveying fluid, which can be gaseous or liquid, is ultimately considered to be a fluid which only serves to convey the reactant into the combustion chamber. The conveying fluid is particularly advantageous if a powder is to be injected. It can, for example, be air or water. A solvent, which can be water, in addition to conveying the reactant into the combustion chamber serves to absorb the active component of the reactant.

The active component can be ammonia, urea or another nitrogen-containing compound which preferably at increased temperature releases ammonia and in this way can be used for selective non-catalytic reduction. The active component, which is preferably a reactive component, can also be an alkaline earth metal, e.g. calcium or magnesium, preferably in the form of an oxide, hydroxide and/or carbonate. This is particularly advantageous for desulphurisation. Compounds which also occur in nature, such as dolomite or limestone, are also possible. For example, in order to modify the melting point of the ash carried along by the flue gas, different minerals, which are specifically selected dependent on the ash of the respectively used fuel, can also be used as the active component of the reactant. In this way, for example, an unwanted low ash melting point can be avoided.

The propellant can be injected into the combustion chamber at a greater speed than the reactant, in order to improve the mixing and distribution of the reactant. Alternatively or additionally, the enveloping medium can be injected into the combustion chamber at a greater speed than the speed of the mixture jet, so that the enveloping medium increasingly sucks in the mixture jet. Advantageously, provision can also be made for the discharge speed of the enveloping medium to be greater than the corresponding relative speed of the flue gas in the vertical direction. Then, flue gas is also increasingly sucked in, since the higher speed is accompanied by a lower pressure. Ultimately, in this way the reactant and the flue gas are gradually and uniformly mixed.

In order to prevent corrosion and depositions, it is appropriate if the reactant is injected into the combustion chamber via at least one multi-component nozzle. The multi-component nozzle is therefore integrated into the wall of the combustion chamber. However, a plurality of multi-component nozzles could also be provided in the same wall or in different walls. The multi-component nozzles can be arranged opposite one another or offset in relation to one another. However, placing the multi-component nozzle on a lance or a nozzle fitting in the flue gas flow, i.e. in the combustion chamber, is also not in principle ruled out, even if this in principle will be less preferred.

In order to be able to also distribute the reactant over the cross section of large steam generators, the reactant can be injected via a plurality of multi-component nozzles on at least one plane of the combustion chamber. The multi-component nozzles can be aligned in such a way that the reactant is injected tangent to a centre circle in the plane, in order to obtain good intermixing and a uniform temperature distribution. This is particularly advantageous if a tangential firing system is provided in the combustion chamber, in which the burners are also aligned tangent to a centre circle in the burner plane. The multi-component nozzles can be aligned in the same direction or in the opposite direction to the burner nozzles, in order to produce a clockwise or anti-clockwise rotating flow. If a high impulse flow is produced by the enveloping medium, it can be advantageous if the rotational directions of the firing system or burners and the multi-component arrangement are opposed.

The enveloping medium can be gaseous and/or liquid. In addition, the enveloping medium should be colder than the flue gas to delay vaporisation of the reactant. Basically, to simplify matters in terms of the method, the enveloping medium can be flue gas, steam, water, vapours, and/or air and/or a mixture of these media. If the enveloping medium has a proportion of liquid, such as water and/or steam, such as water vapour, this can favour the energy balance or the delay in vaporisation of the reactant.

A so-called process-related fluid is appropriate as the enveloping medium, so that no additional medium has to be provided and so that media already present can be used which possibly have to be fed to the combustion chamber anyway. Process-related fluids are those which are available in the process of producing steam or in associated processes. Therefore, a process-related fluid can be, for instance, flue gas which, for example, can be extracted upstream or downstream from an air preheater or alternatively after dedusting. It can also be combustion air which can be extracted downstream from the forced draught fan, upstream or downstream from the air preheater. The air can be a part of the primary air of a mill for comminuting the fuel for firing. It can also be process steam, for instance from a low pressure, medium pressure or high pressure rail, or vapours, for instance from drying fuel. Provided that advantageously water is used as the enveloping medium or as part of the enveloping medium, this can be feed water or condensate.

In terms of the fluid flow, it is advantageous if the reactant opening, the propellant opening and/or the enveloping medium opening are formed concentrically in relation to one another. A reactant opening or a plurality of reactant openings can be provided centrally. A propellant opening and/or a plurality of propellant openings can then be provided concentrically around it. In addition, an enveloping medium opening or a plurality of enveloping medium openings can be provided concentrically to at least one reactant opening and/or at least one propellant opening. However, it is particularly preferred if a reactant opening is provided centrally which is encompassed concentrically by an annular opening for the propellant. An annular opening can again be provided concentrically to it for the enveloping medium. This is technically easier to implement.

The reactant feed and/or the propellant feed can have a nozzle-shaped cross-section tapering on the combustion chamber side, so that the reactant, propellant and enveloping medium are mixed in a targeted manner. Alternatively or additionally, for the same reason, the enveloping medium feed can have a cross-section widening on the combustion chamber side.

Technically, it is easier if the at least one multi-component nozzle is arranged as a multi-component wall nozzle in a wall of the combustion chamber, instead of providing the nozzle via a lance and placing it in the combustion chamber.

Mixing in the combustion chamber can be particularly uniformly achieved if a plurality of multi-component nozzles is provided on at least one plane. Here, it is further preferred if this plane is provided in the flue gas direction between the burners and the heat exchangers for generating steam. The temperature can be satisfactory there. In addition, a treatment of the flue gas can be carried out which, for instance, has a beneficial effect on corrosion, before the flue gas comes into contact with the heat exchangers.

Particularly if the flue gases flow approximately vertically from the bottom to the top, it is advantageous in terms of mixing if the at least one multi-component nozzle is provided such that the reactant is injected essentially horizontally into the combustion chamber. At the same time, it is particularly advantageous if the angle of injection can be varied, in order, for instance, to be able to react to different operating conditions. This can be effected, for instance, by being able to incline the at least one multi-component nozzle with respect to the vertical. If the at least one multi-component nozzle can be alternatively or additionally inclined with respect to the horizontal, the flow in the combustion chamber can thereby be set into more or less powerful rotation.

BRIEF DESCRIPTION OF THE DRAWINGS

The invention is explained in more detail below with the aid drawing illustrating exemplary, non-limiting embodiments.

DESCRIPTION OF THE INVENTION

Figure 1:
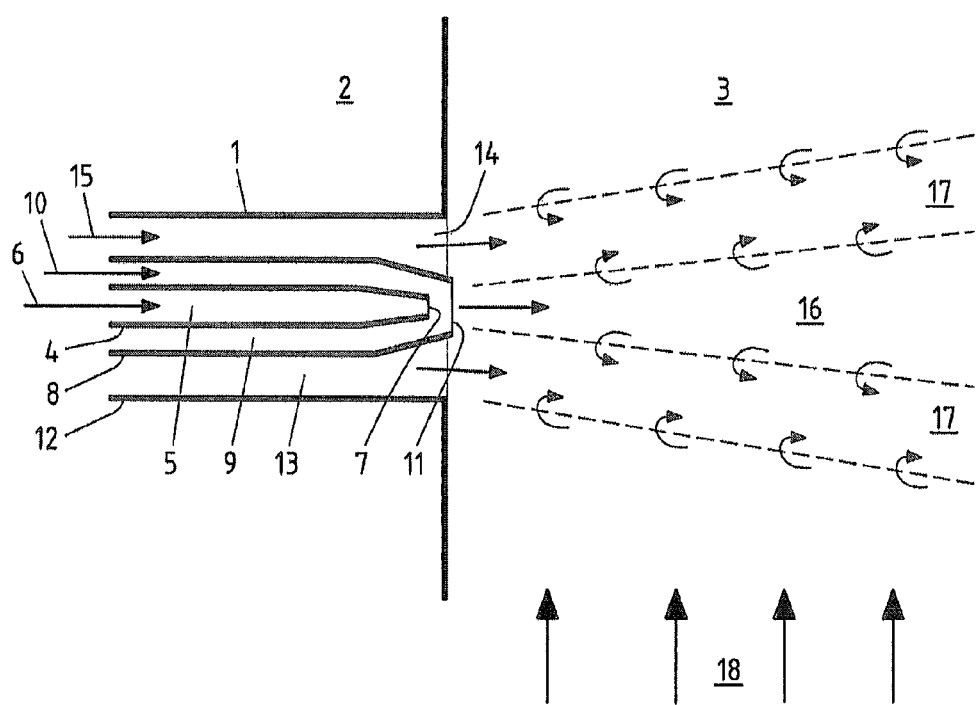
FIG. 1 shows a multi-component nozzle according to the invention in a wall of a first combustion chamber according to the invention of a steam generator, in a vertical sectional view.

In FIG. 1, a multi-component nozzle 1 is illustrated in a wall 2 of a combustion chamber 3. The multi-component nozzle 1 has a centrally arranged reactant tube 4, which serves as the reactant feed 5 for the reactant 6, the reactant feed 5 ending in a reactant opening 7 on the combustion chamber side. The central reactant tube 4 is accommodated in a concentric propellant tube 8 with a greater diameter which together with the reactant tube 4 forms the propellant feed 9. The propellant 10 is conveyed in the intermediate space between the concentric tubes to the propellant opening 11 on the combustion chamber side. The two inner tubes are encompassed by an outer enveloping medium tube 12 which is also concentric and which together with the propellant tube 8 forms the enveloping medium feed 13 and an enveloping medium opening 14 on the combustion chamber side for discharging enveloping medium 15. The reactant tube 4, the propellant tube 8 and the enveloping medium tube 12 have circular cross sections, although in principle other cross sections are also conceivable.

The multi-component nozzle illustrated in FIG. 1, schematically and by way of example, comprises a reactant nozzle and a propellant nozzle. In principle, the two-component nozzles or other nozzle designs known from the prior art can be used for this purpose.

In the case of the illustrated and in this respect preferred multi-component nozzle 1, the reactant opening 7 is provided before the propellant opening 11 in the direction of flow of the reactant 6, so that the reactant is initially mixed with the propellant 10 in the propellant feed 9 and forms a mixture jet 16 which enters into the combustion chamber 3 through the propellant opening 11. When a liquid reactant 6 and a gaseous propellant 10 are used, the reactant 6 is nebulised downstream from the reactant opening 7 in the flow direction. The reactant 6 can also be, for example, a mixture consisting of a powder and a conveying gas. The powder is then further swirled by the propellant 10 after leaving the reactant opening 7.

The reactant 6 and the propellant 10 are mixed further in the combustion chamber 3, which is due to the relatively higher speed of the propellant 10. This is further supported by the tapering of the flow cross sections of the reactant feed 5 and the propellant feed 9, namely before the reactant opening 7 and the propellant opening 11. Since the cross section of the enveloping medium tube 12 does not change on the combustion chamber side, in the case of the illustrated and in this respect preferred multi-component nozzle 1, a widening of the flow cross section of the enveloping medium feed 13 occurs.

In FIG. 1, the flow area of the mixed jet 16, which is essentially formed from reactant 6 and propellant 10, and the flow area of the enveloping flow 17, which is essentially formed from enveloping medium 15, are illustrated by dashed lines. The flow area of the enveloping flow 17 fully envelops the mixture jet 16 seen in a cross section perpendicular to the flow direction. Since the enveloping flow 17 has a higher speed than the mixture jet 16 and the flue gas 18, the enveloping flow 17 increasingly sucks in the mixture and flue gas 18, which is made clear by the illustrated arrows. This mixing leads to gradual contact between reactant 6 and flue gas 18 along the jet, so that the jet projects well into the combustion chamber 3. In the case of a liquid reactant 6, this is accordingly slowly vaporised, so that an interaction or reaction between the reactant 6 and the flue gas 18 also occurs further inside the combustion chamber 3. Without the enveloping medium 15, the mixture jet 16 would immediately come into contact with the hot flue gas 18 and, in the case of a liquid reactant 6, would immediately vaporise.

In addition, the enveloping medium 15 increases the impulse of the whole jet without greatly reducing the droplet size. This leads to an increase in the penetration depth of the reactant 6 into the combustion chamber 3 and to further intermixing of the flue gas 18, which favours the reactions taking place in it. In the illustrated and in this respect preferred combustion chamber 3, the flue gas 18 flows vertically from the bottom to the top, while the reactant 6 is injected horizontally into the combustion chamber 3.

Figure 2:
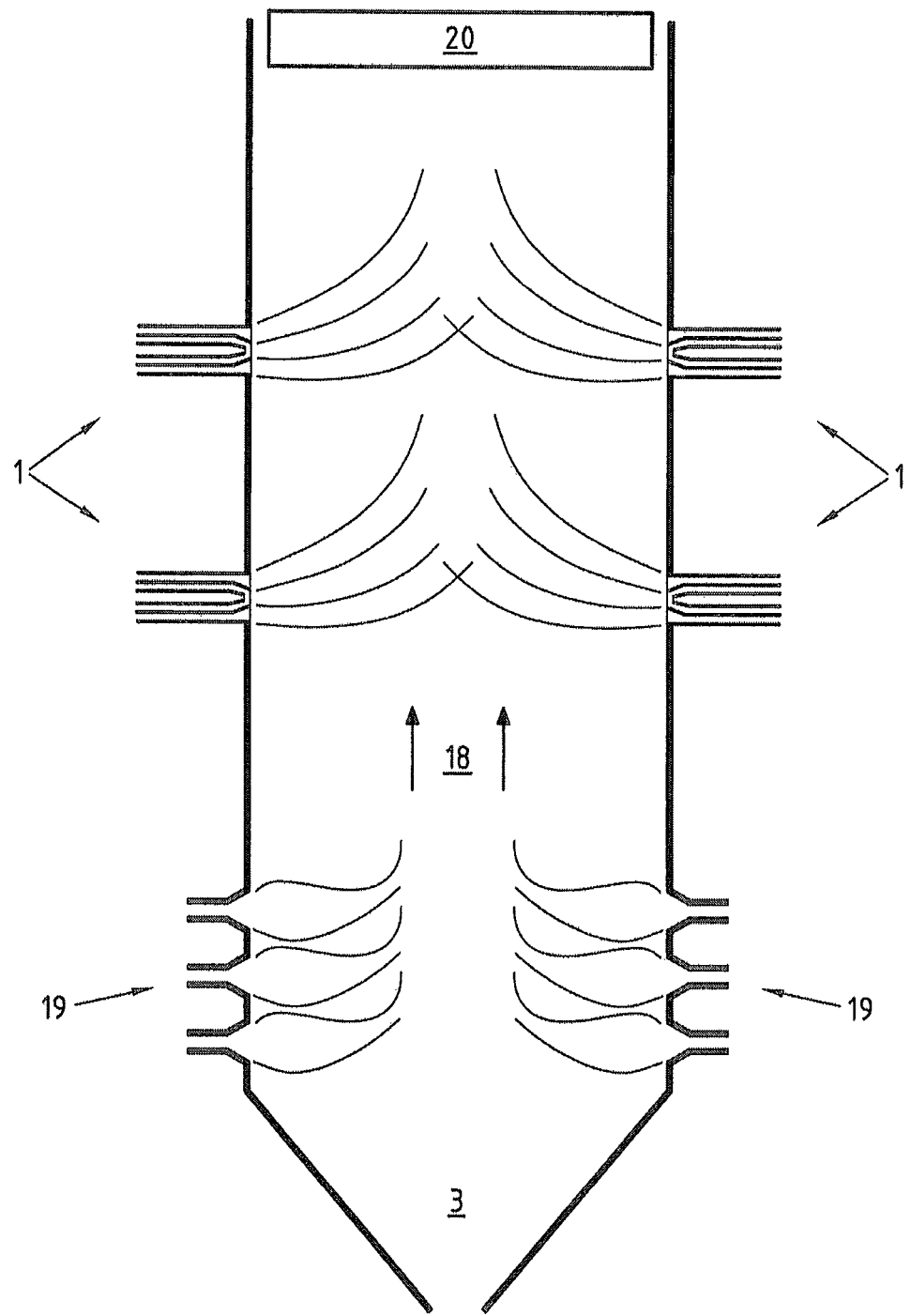
FIG. 2 shows the combustion chamber from FIG. 1 in a vertical sectional view.

The arrangement of the multi-component nozzles 1 in the combustion chamber 3 is illustrated in FIG. 2. In the lower area of the combustion chamber 3, the burners 19 of the same are provided. The flue gases 18 produced by the burners 19 drift upwards where two levels of multi-component nozzles 1 are provided which in each case inject a mixture flow 16 and an enveloping flow 17 horizontally into the combustion chamber 3. The flows reach as far as the central area of the combustion chamber 3, wherein, however, from the wall 2 as far as the central area the mixture jet 16 and the enveloping flow 17 increasingly mix with one another and with the flue gas 18. However, the two levels of multi-component nozzles 1 illustrated in FIG. 2 are preferably not obligatory. More or fewer levels can also be provided. The individual levels can also be individually activated and deactivated as a function of the temperature profile in the combustion chamber 3, for instance. A heat exchanger 20, which removes heat from the flue gas 18 and in the process produces steam, is provided at a distance above the two levels which enables the reactant 6 to react sufficiently with the flue gas 18.

Figure 3:
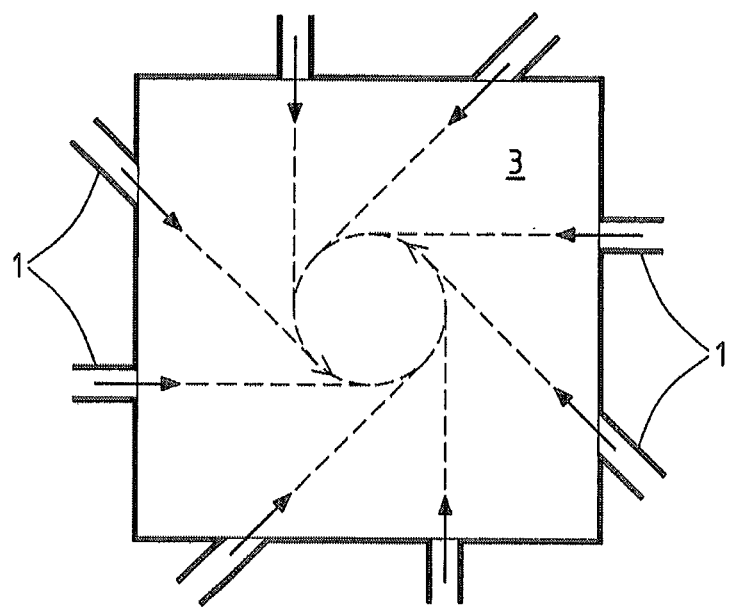
FIG. 3 shows a second combustion chamber according to the invention in a horizontal sectional view.

The arrangement of multi-component nozzles 1 in another combustion chamber 3 is illustrated in FIG. 3. The multi-component nozzles 1 are all aligned tangent to a virtual circle in the centre of the cross section of the combustion chamber. This arrangement of the multi-component nozzles 1 induces a rotation of the flue gas in the illustrated and in this respect preferred combustion chamber 3. The same rotation is achieved by the same alignment of the burners. This is called tangential firing.

Figure 4:
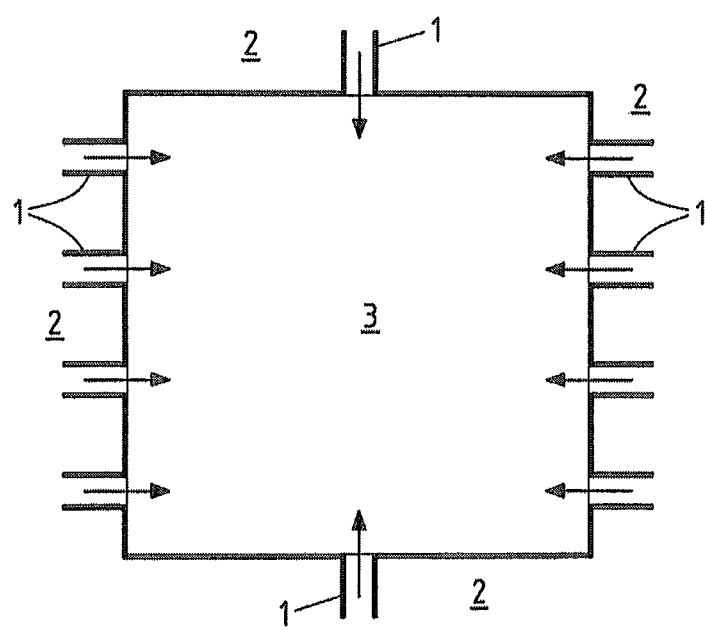
FIG. 4 shows a third combustion chamber according to the invention in a horizontal sectional view.

An alternative alignment of the multi-component nozzles 1 on a plane of a combustion chamber 3 is illustrated in FIG. 4. The multi-component nozzles 1 are in each case arranged opposite one another on opposite walls 2 in each case. Alternatively, the multi-component nozzles 1 could be arranged horizontally offset in relation to one another on opposite walls 2. In addition, only one wall 2 or two opposite walls 2 can have one or more multi-component nozzles 1.

The invention claimed is:

1. A method for reducing unwanted substances by injecting a reactant into a flue gas of a steam generator, comprising:
   injecting the reactant into the combustion chamber of the steam generator via a reactant opening of a multi-component nozzle,
   injecting a propellant into the combustion chamber, such that the propellant supports the injection or the distribution of the reactant,
   forming a mixture jet comprising the reactant and the propellant in the combustion chamber, and
   injecting an enveloping medium into the combustion chamber through at least one enveloping medium opening arranged outside the reactant opening,
   wherein the enveloping medium at least partly envelops the mixture jet in the combustion chamber and at least partly shields the reactant from the flue gas.

2. The method according to claim 1, wherein the propellant is injected into the combustion chamber through at least one propellant opening arranged outside the reactant opening.

3. The method according to claim 1, wherein the reactant is injected into the combustion chamber in the form of a gas, a liquid or a powder.

4. The method according to claim 1, wherein the reactant comprises an active component comprising ammonia, urea, other nitrogen-containing compounds, or alkaline earth metals.

5. The method according to claim 1, wherein the propellant is injected into the combustion chamber at a greater speed than the reactant.

6. The method according to claim 1, wherein the reactant is injected into the combustion chamber via at least one multi-component wall nozzle arranged in at least one wall of the combustion chamber.

7. The method according to claim 1, wherein the enveloping medium comprises flue gas, steam, water, vapours, or air.

8. The method according to claim 1, wherein a process-related fluid is used as the enveloping medium.

9. The method according to claim 1, wherein the reactant is injected via a plurality of multi-component nozzles on at least one plane of the combustion chamber.

10. The method according to claim 1, wherein the enveloping medium is injected into the combustion chamber at a greater speed than the speed of the mixture jet.

11. A multi-component nozzle for injecting a reactant into a combustion chamber of a steam generator for reducing unwanted substances in the flue gas, comprising:
- a reactant feed having a combustion chamber side whereon the reactant feed opens into a reactant opening,
- a propellant feed for feeding a propellant serving to inject or distribute the reactant and,
- an enveloping medium feed for feeding an enveloping medium, opening into at least one enveloping medium opening arranged outside the reactant opening, such that the enveloping medium at least partly shields the reactant from the flue gas in the combustion chamber.

12. The multi-component nozzle according to claim 11, wherein the propellant feed has a combustion chamber side whereon the propellant feed opens into at least one propellant opening arranged outside the reactant opening, and wherein the enveloping medium feed opens into at least one enveloping medium opening arranged outside the propellant opening.

13. The multi-component nozzle according to claim 12, wherein the reactant opening, the propellant opening, and the enveloping medium opening are formed concentrically in relation to one another.

14. The multi-component nozzle according to claim 11, wherein the multi-component nozzle is arranged as a multi-component wall nozzle in a wall of the combustion chamber.

15. A combustion chamber of a steam generator, comprising at least one multi-component nozzle according to claim 11.

16. The combustion chamber according to claim 15, wherein the multi-component nozzle is integrated into at least one wall of the combustion chamber.

17. The combustion chamber according to claim 15, wherein a plurality of multi-component nozzles is provided on at least one plane, wherein the plane is provided in the flue gas direction between the burners and the heat exchangers for generating steam.

18. The combustion chamber according to claim 15, wherein the reactant is essentially horizontally injected into the combustion chamber.

* * * * *